US012049159B2

(12) United States Patent
Mo

(10) Patent No.: US 12,049,159 B2
(45) Date of Patent: Jul. 30, 2024

(54) HEIGHT ADJUSTMENT MECHANISM FOR HEADREST AND CHILD SUPPORT DEVICE

(71) Applicant: BAMBINO PREZIOSO SWITZERLAND AG, Steinhausen (CH)

(72) Inventor: Xiaolong Mo, Guangdong (CN)

(73) Assignee: BAMBINO PREZIOSO SWITZERLAND AG, Steinhausen (CH)

( * ) Notice: Subject to any disclaimer, the term of this patent is extended or adjusted under 35 U.S.C. 154(b) by 0 days.

(21) Appl. No.: 18/450,098

(22) Filed: Aug. 15, 2023

(65) Prior Publication Data

US 2023/0382278 A1 Nov. 30, 2023

Related U.S. Application Data

(63) Continuation of application No. 17/499,658, filed on Oct. 12, 2021, now Pat. No. 11,760,237.

(30) Foreign Application Priority Data

Oct. 13, 2020 (CN) .......................... 202011093540.0

(51) Int. Cl.
*B60N 2/26* (2006.01)
*B60N 2/28* (2006.01)
(Continued)

(52) U.S. Cl.
CPC ........... *B60N 2/2851* (2013.01); *B60N 2/815* (2018.02); *B60N 2/818* (2018.02); *B60N 2/888* (2018.02); *B60N 2002/899* (2018.02)

(58) Field of Classification Search
CPC ...... B60N 2/2851; B60N 2/815; B60N 2/818; B60N 2/888; B60N 2/2866; B60N 2/2812
See application file for complete search history.

(56) References Cited

U.S. PATENT DOCUMENTS 7,246,852 B2   7/2007   Balensiefer
7,862,117 B2 *  1/2011   Hutchinson .......... B60N 2/2875
                                              297/410
(Continued)

FOREIGN PATENT DOCUMENTS

CA   2881133 A1   8/2015
CA   2912034 A1   5/2016
(Continued)

OTHER PUBLICATIONS

TW Office Action dated Dec. 13, 2022 for TW Application No. 110137934.
(Continued)

*Primary Examiner* — Shin H Kim
(74) *Attorney, Agent, or Firm* — Quarles & Brady LLP

(57) ABSTRACT

A height adjustment mechanism for a headrest includes: a locking member configured to be locked with a height adjustment gear, the locking member having a first locking position and a first unlocking position, and the locking member being capable of switching between the first locking position and the first unlocking position; an operating member having an initial position, a first operating position and a second operating position; a safety lock structure configured to lock the locking member in the first locking position, the safety lock structure being movably connected on the operating member; and a driving member, one side of the driving member being slidably connected to the operating member, the other side of the driving member abutting against the locking member.

21 Claims, 7 Drawing Sheets

(51) Int. Cl.
  *B60N 2/815* (2018.01)
  *B60N 2/818* (2018.01)
  *B60N 2/888* (2018.01)
  *B60N 2/80* (2018.01)

(56) References Cited

U.S. PATENT DOCUMENTS

| | | | |
|---|---|---|---|
| 8,141,951 | B2 | 3/2012 | Chen |
| 8,944,503 | B2 * | 2/2015 | Gates ................ B60N 2/2851 297/475 |
| 10,632,871 | B2 | 4/2020 | Schmitz et al. |
| 11,413,992 | B2 * | 8/2022 | Zhang ................ B60N 2/2887 |
| 2005/0200177 | A1 | 9/2005 | Balensiefer |
| 2007/0246982 | A1 * | 10/2007 | Nett ................ B60N 2/809 297/250.1 |
| 2012/0074758 | A1 * | 3/2012 | Gates ................ B60N 2/2851 297/479 |
| 2015/0246629 | A1 | 9/2015 | Bohm |
| 2019/0070984 | A1 | 3/2019 | Schmitz et al. |
| 2022/0111776 | A1 * | 4/2022 | Mo ................ B60N 2/818 |

FOREIGN PATENT DOCUMENTS

| | | |
|---|---|---|
| CN | 201192996 Y | 2/2009 |
| CN | 202541370 U | 11/2012 |
| CN | 203449984 U | 2/2014 |
| CN | 105711450 A | 6/2016 |
| CN | 205326847 U | 6/2016 |
| CN | 205553984 U | 9/2016 |
| CN | 205768806 U | 12/2016 |
| CN | 107199922 A | 9/2017 |
| CN | 107599905 A | 1/2018 |
| CN | 207550009 U | 6/2018 |
| CN | 207565392 U | 7/2018 |
| CN | 208484587 U | 2/2019 |
| CN | 208530351 U | 2/2019 |
| CN | 209240925 U | 8/2019 |
| CN | 111186347 A | 5/2020 |
| CN | 211684779 U | 10/2020 |
| CN | 112406646 A | 2/2021 |
| DE | 102011010232 A1 | 8/2012 |
| DE | 102007063746.4 B4 | 4/2015 |
| KR | 20100009077 A | 1/2010 |
| TW | I661954 B | 6/2019 |

OTHER PUBLICATIONS

English Language Translation of an Office Action as issued by the German Patent and Trademark Office, Office Action dated Nov. 3, 2022 for DE No. 10 2021 211 535.7.

Office Action as issued by the German Patent and Trademark Office, Office Action dated Nov. 3, 2022 for DE No. 10 2021 211 535.7.

Notice of Allowance, Chinese Application No. 202011093540.0, Nov. 23, 2023 (with English translation).

Office Action, Taiwanese Patent Application No. 112134902, Mar. 26, 2024.

* cited by examiner

HEIGHT ADJUSTMENT MECHANISM FOR HEADREST AND CHILD SUPPORT DEVICE

CROSS-REFERENCE TO RELATED APPLICATIONS

This application is a continuation application of U.S. application Ser. No. 17/499,658 filed Oct. 12, 2021, now allowed, which claims all benefits to Chinese Patent Application No. 202011093540.0, filed on Oct. 13, 2020, the contents of which are hereby incorporated by reference.

TECHNICAL FIELD

The present disclosure generally relates to a field of infant products, and in particular, to a height adjusting mechanism for a headrest and a child support device having the height adjusting mechanism.

BACKGROUND

With continuous development of the society, more and more families have their own cars, and more and more children travel with their parents by car. Due to a weak self-protection ability of children, children in cars often suffer more injuries than adults in accidents. In view of this situation, there are various child safety seats in the market which can be fixed to ordinary car seats for use, resulting in that children in the car can have a comfortable feeling while being safe and secure.

In general, the child safety seat includes a base and a child support device detachable to the base. The base can be connected with an interface of a car seat via an International Standards Organization FIX (ISOFIX) installed at the rear end of the base. The child support device is provided with a height adjustable headrest, and the height of the headrest can be adjusted to match a height of the child, thus ensuring a safety and a comfort of the child. The child support device generally includes the headrest and a support body, and the support body includes a height adjustment gear for adjusting a height of the headrest. Accordingly, the headrest is provided with a locking member matching the height adjustment gear. The headrest can be adjusted up and down relative to the support body to achieve the height adjustment of the headrest. The headrest is locked at a target height by matching the locking member with the height adjustment gear. For a conventional adjusting mode of the headrest, a user can unlock the locking member with height adjustment gear directly in one step by pulling or wrenching. However, this one-step unlocking method is prone to a phenomenon of wrong unlocking, i.e., the headrest can be unlocked accidentally, which results in a reduced security and cannot meet existing needs.

Therefore, a height adjustment mechanism for a headrest and a child support device are urgently desired to overcome the above defects.

SUMMARY

According to some embodiments, a height adjusting mechanism of a headrest and a child support device having the height adjusting mechanism are provided.

The height adjustment mechanism for a headrest includes an operating member, a driving member, a safety lock structure, and a locking member. The locking member is configured to be locked with a height adjustment gear, the locking member has a first locking position and a first unlocking position, and the locking member is capable of switching between the first locking position and the first unlocking position. The operating member has an initial position, a first operating position and a second operating position. The safety lock structure is configured to lock the locking member in the first locking position, the safety lock structure is movably connected on the operating member, and the safety lock structure is driven by the operating member switching from the initial position to the first operating position to unlock the locking member. One side of the driving member is slidably connected to the operating member, the other side of the driving member abuts against the locking member, and the driving member is pulled by the operating member switching from the first operating position to the second operating position, and the locking member is driven by the driving member to switch from the first locking position to the first unlocking position.

The child support device includes a support body and a headrest movably provided on the support body. The support body further includes the above height adjustment mechanism for the headrest, the support body includes the height adjustment gear for adjusting a height of the headrest, the locking member is pivotally connected to the headrest, and the operating member and the driving member are slidably provided on the headrest.

The present disclosure will become clearer through the following description in conjunction with the accompanying drawings, which are used to explain the embodiments of the present disclosure.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION OF THE EMBODIMENTS

Figure 1:
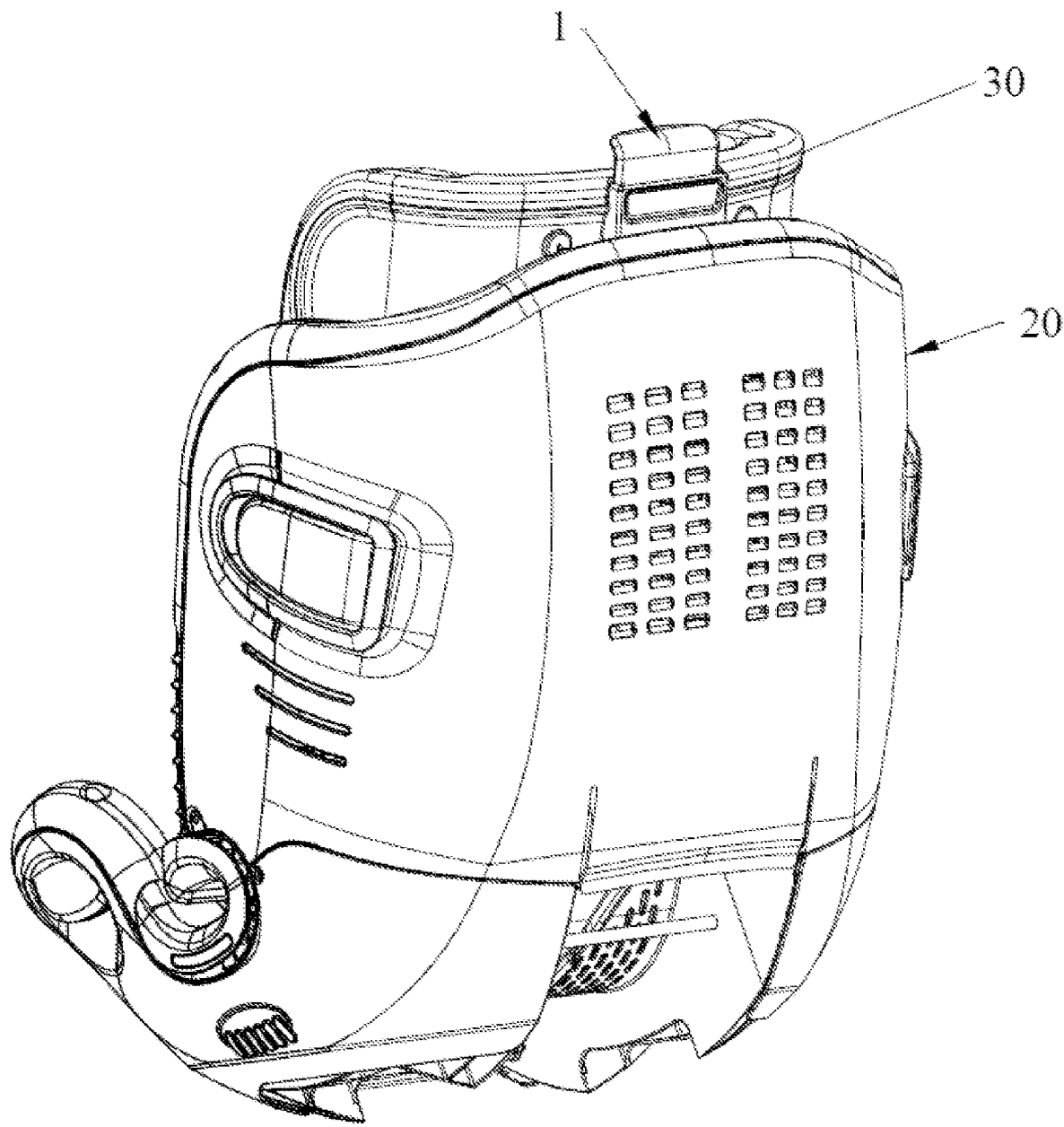
FIG. 1 is a perspective view of a child support device according to an embodiment of the present disclosure.
Figure 2:
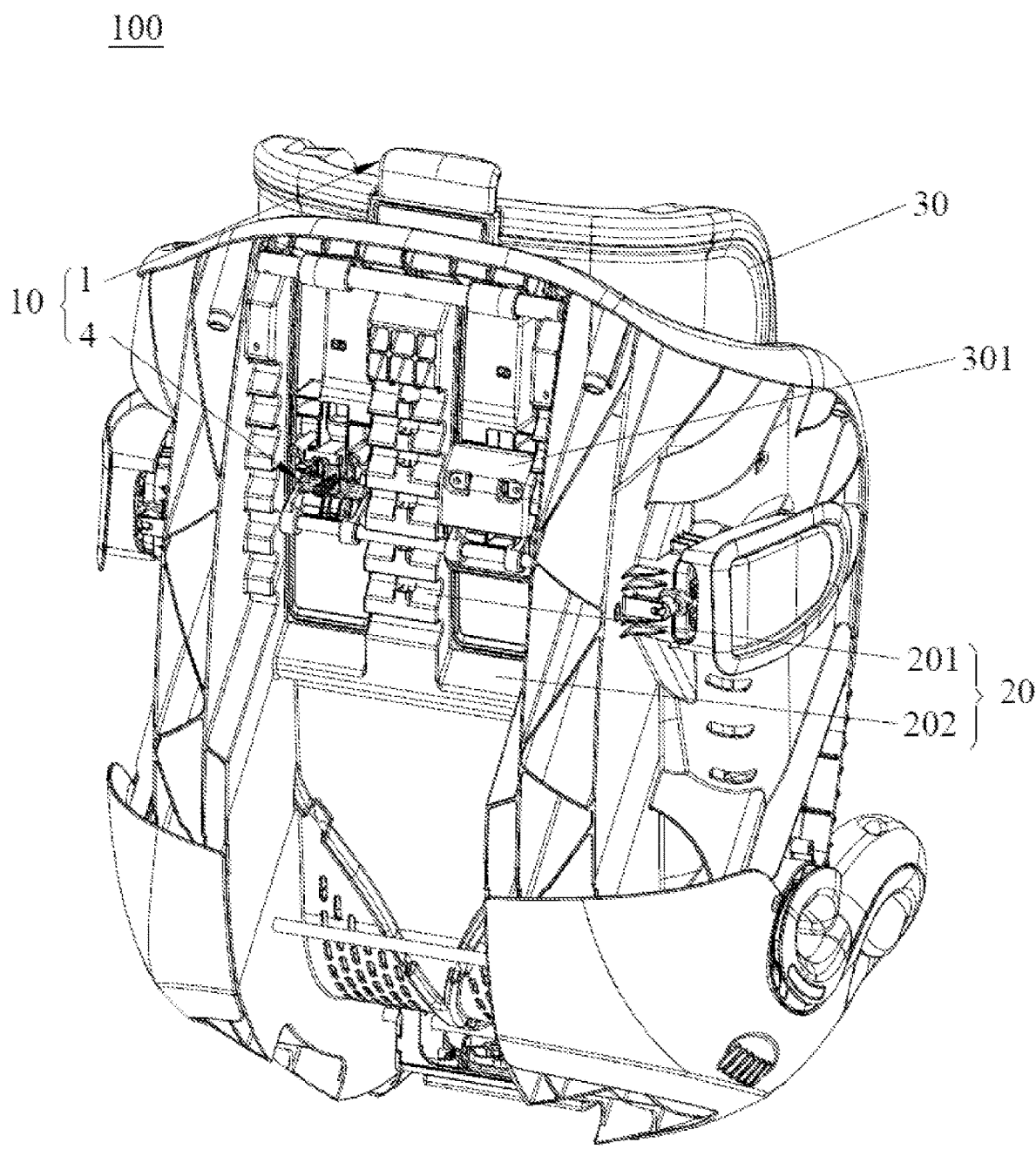
FIG. 2 is a perspective view illustrating an internal structure of the child support device of FIG. 1.

Embodiments of the invention are described more fully hereinafter with reference to the accompanying drawings. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art. Elements that are identified using the same or similar reference characters refer to the same or similar elements.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Referring to FIG. 1 to FIG. 5, a child support device 100 according to an embodiment of the present disclosure includes a support body 20, a headrest 30, and a height adjustment mechanism 10 for the headrest 30. The headrest 30 is movably provided on the support body 20, such that a height of the headrest 30 can be adjusted relative to the support body 20. The height adjustment mechanism 10 is provided on the headrest 30, and the height adjustment mechanism 10 can slide up and down with the headrest 30.

The height adjustment mechanism 10 includes an operating member 1, a driving member 2, a safety lock structure 3, a locking member 4, and a second elastic member 5. The support body 20 includes a height adjustment gear 201 for adjusting the height of the headrest 30. The locking member 4 is configured to be locked with the height adjustment gear 201. The locking member 4 is pivotally connected to the headrest 30, and an end of the locking member 4 is rotatably and detachably locked with the height adjustment gear 201. The locking member 4 has a first locking position and a first unlocking position, and the locking member 4 is capable of switching between the first locking position and the first unlocking position. The locking member 4 in the first locking position is locked with the height adjustment gear 201 (shown in FIG. 3), and the locking member 4 in the first unlocking position is disengaged from the height adjustment gear 201. The operating member 1 is located on an upper portion of the headrest 30 and is slidably provided on the headrest 30. The operating member 1 has an initial position, a first operating position, and a second operating position, and the operating member 1 can be movably switched among the initial position, the first operating position, and the second operating position. The second elastic member 5 is provided between the headrest 30 and the operating member 1, and is capable of providing an elastic force that keeps the operating member 1 in the initial position. By pulling upward, the operating member 1 can overcome the elastic force of the second elastic member 5 and move from the initial position to the first operating position or the second operating position, thereby facilitating operation. The safety lock structure 3 is configured to lock the locking member 4 in the first locking position. The safety lock structure 3 is movably provided on the operating member 1, and the movement of the operating member 1 switching from the initial position to the first operating position can drive the safety lock structure 3 to unlock the locking member 4, such that a subsequent unlocking operation can only be performed when the operating member 1 is in the first operating position. At the same time, the driving member 2 is slidably provided on the headrest 30. One side of the driving member 2 is slidably connected to the operating member 1, and the other side of the driving member 2 abuts against the locking member 4. In the present embodiment, an upper end of the driving member 2 is slidably connected to the operating member 1, and a lower end of the driving member 2 abuts against the locking member 4. The driving member 2 is pulled by the operating member 1 switching from the first operating position to the second operating position, and the locking member 4 is driven by the driving member 2 to switch from the first locking position to the first unlocking position, such that the locking member 4 is disengaged from the height adjustment gear 201, so as to achieve a purpose of unlocking. In other words, if it is required to adjust the height of the headrest 30, the safety lock structure 3 should be firstly unlocked by switching the operating member 1 from the initial position to the first operating position, and then a subsequent height adjustment of the headrest 30 can be achieved by disengaging the locking member 4 from the height adjustment gear 201, so as to avoid an accidental unlocking of the headrest 30. A two-step unlocking method can avoid the abnormal unlocking phenomenon of the conventional height adjustment mechanism effectively, thereby improving the safety of the child support device 100.

Referring to FIG. 4 to FIG. 7, the safety lock structure 3 has a second locking position and a second unlocking position. The second locking position is configured to lock the locking member 4 at the first locking position, and the second unlocking position is configured to unlock the locking member 4, such that the locking member 4 can switch freely between the first locking position and the first unlocking position. The safety lock structure 3 can switch from the second locking position to the second unlocking position by switching of the operating member 1 from the initial position to the first operating position. Specifically, the operating member 1 is provided with a driving hole 11, the safety lock structure 3 includes a sliding block 31 slidably located in the driving hole 11. The safety lock structure 3 further includes a locking pin 32, and the locking member 4 is provided with a locking hole 41 corresponding to the locking pin 32. When the safety lock structure 3 is in the second locking position, the locking pin 32 is inserted into the locking hole 41, and when the safety lock structure 3 is in the second unlocking position, the locking pin 32 is disengaged from the locking hole 41. In a process of switching the operating member 1 from the initial position to the first operating position, the operating member 1 will move upwardly, which causes the driving hole 11 to move upwardly. The sliding block 31 is driven by the driving hole 11 to move, such that the safety lock structure 3 switches from the second locking position to the second unlocking position, i.e., the locking pin 32 and the locking hole 41 are switched from an engaged state to a disengaged state, so as to achieve a purpose of subsequent free rotation of the locking member 4.

Referring to FIG. 1 to FIG. 7, the driving hole 11 includes a first guide hole 111 and a second guide hole 112 that are in fluid communication with each other. The first guide hole 111 is configured to switch the safety lock structure 3 from the second locking position to the second unlocking position, and the second guide hole 112 is configured to hold the safety lock structure 3 in the second unlocking position. The first guide hole 111 inclines from outside to inside along a movement direction of the operating member 1. The first guide hole 111 and the second guide hole 112 enable the sliding block 31 to move left and right while the driving hole 11 moves upward, such that the locking pin 32 is disengaged from the locking hole 41. In illustrated embodiment, an extending direction of the first guiding hole 111 intersects with the movement direction of the operating member 1, and a length of the first guiding hole 111 corresponds to a travel of the operating member 1 moving from the initial position to the first operating position. An extending direction of the second guiding hole 112 is parallel with the movement direction of the operating member 1, and a length of the second guiding hole 112 corresponds to a travel of the operating member 1 moving from the first operating position to the second operating position, such that the locking pin 32 moves in a direction away from the locking hole 41 and remains in an unlocking state when the operating member 1 switches from the initial position to the second operating position, so as to achieve a purpose of unlocking.

Figure 4:
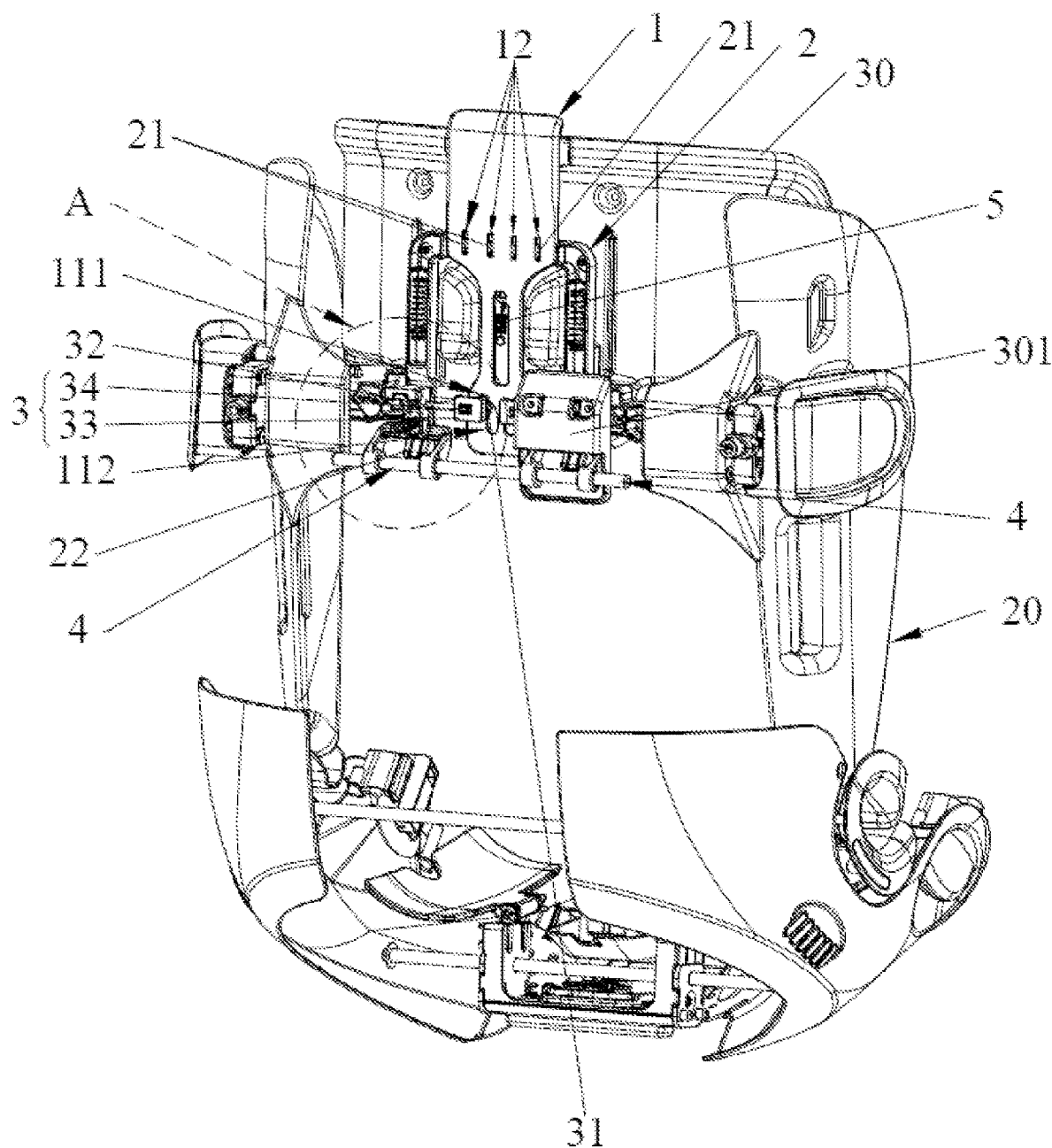
FIG. 4 is a perspective view of the child support device illustrating a state where an operating member moves from an initial position to a first operating position.
Figure 5:
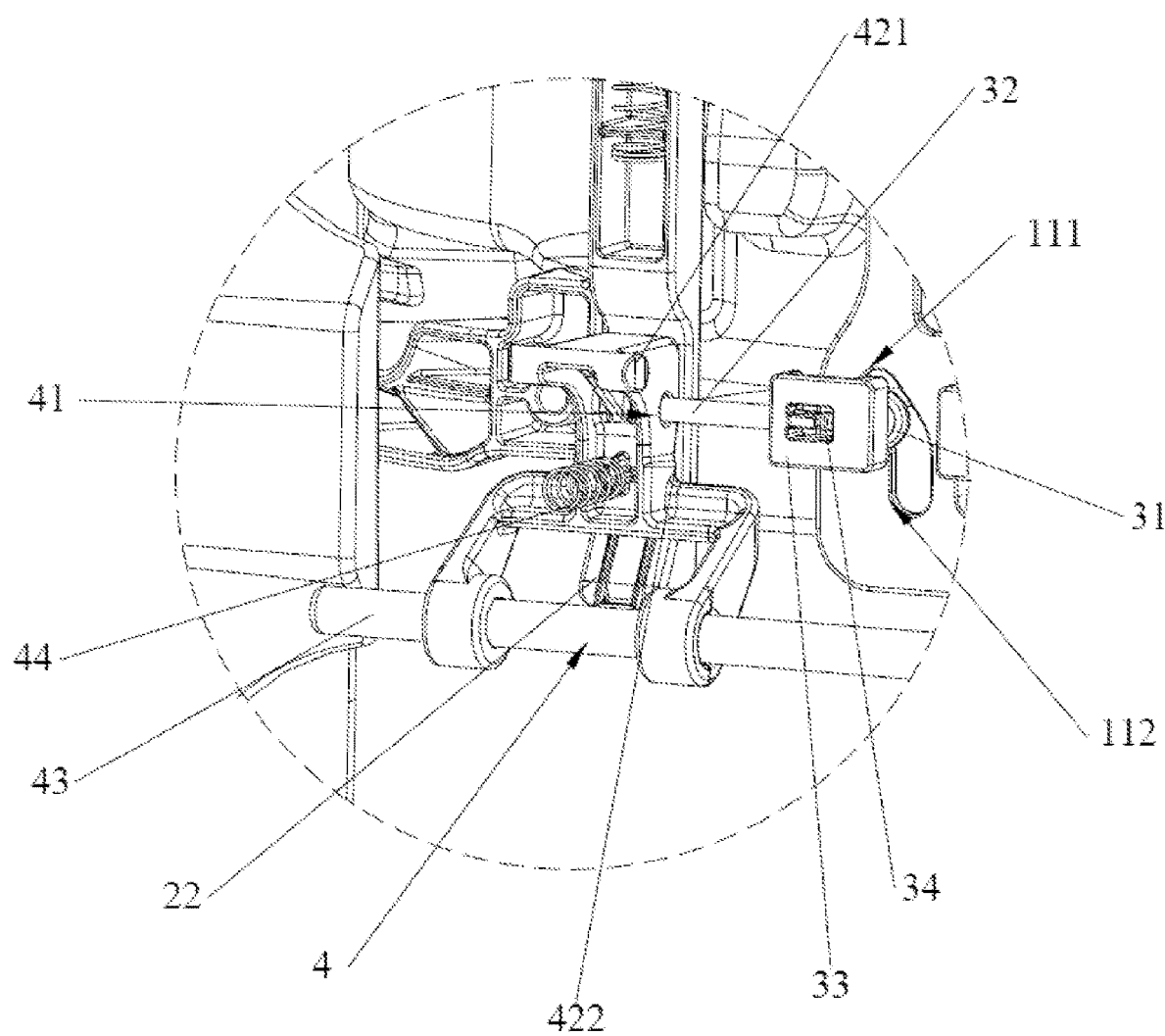
FIG. 5 is a partial enlarged view of portion A of FIG. 4.

Referring to FIG. 4 to FIG. 5, the safety lock structure 3 further includes a safety lock body 33 and a first elastic member 34. The safety lock structure 3 has a mounting chamber (not shown), and the first elastic member 34 is received in the safety lock body 33 via the mounting chamber. The sliding block 31 is located on a side of the safety lock body 33 adjacent to the operating member 1. The locking pin 32 is elastically connected to the safety lock body 33 via the first elastic member 34. The first elastic member 34 enables the locking pin 32 to be elastically stretchable. Therefore, in a inserting process of the locking pin 32 and locking hole 41, not only a good inserting and a high locking accuracy can be achieved, but also a hard collision of the locking pin 32 can be avoided, so as to protect the locking pin 32 and reduce a replacement of parts. In this embodiment, two driving holes 11 are provided, and the two driving holes 11 are symmetrically arranged on left and right of the operating member 1. Correspondingly, there are two safety lock structures 3, and the two safety lock structures 3 are symmetrically arranged. Of course, a producer can adjust the driving hole 11 and the safety lock structure 3 according to actual needs, which is not limited hereto.

Referring to FIG. 4 to FIG. 7, the operating member 1 is provided with an avoiding hole 12, the driving member 2 includes a pulling member 21 slidably provided in the avoiding hole 12. When the operating member 1 switches between the initial position and the first operating position, the pulling member 21 slides in the avoiding hole 12. In other words, in a process of the operating member 1 switching from the initial position to the first operating position, due to an avoiding effect of the avoiding hole 12, the operating member 1 will not drive the driving member 2 to move, i.e., the driving member 2 remains still, such that only after the operating member 1 moves to the first operating position can the driving member 2 be driven to move to release the lock, so as to match a locking function of the safety lock structure 3. The switching of the operating member 1 from the first operating position to the second operating position causes the pulling member 21 to move under the limiting of the driving hole 11, and the locking member 4 is driven to switch from the first locking position to the first unlocking position, so as to disengage the locking member 4 from the height adjustment gear 201. In the illustrated embodiment, the pull member 21 is an inserting piece, and the avoiding hole 12 is an elongated hole matching the inserting piece.

Figure 3:
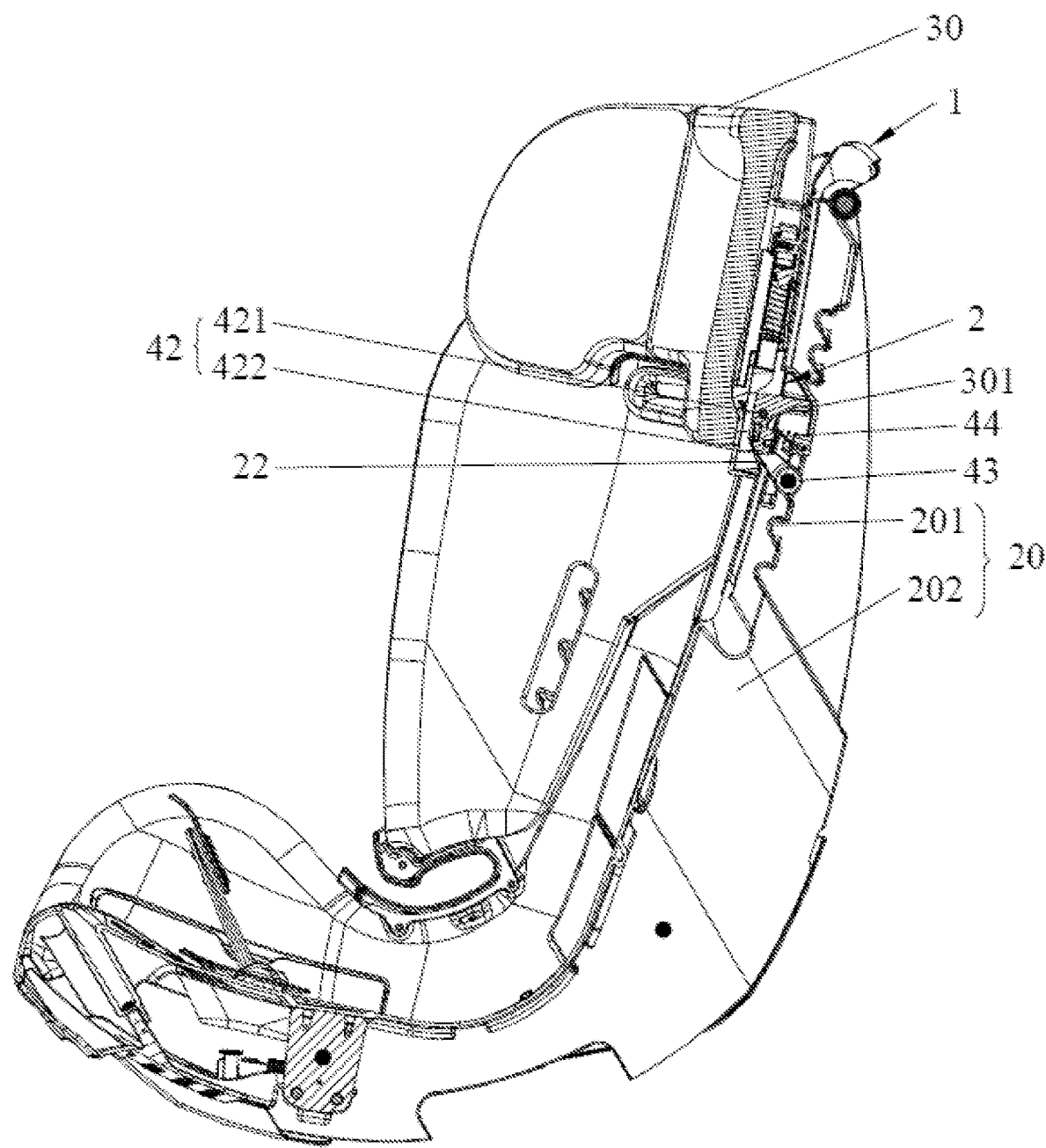
FIG. 3 is a cross-sectional view of the child support device of FIG. 1 taken along a longitudinal direction.

Referring to FIG. 3 to FIG. 5, the headrest 30 includes a fixing cover plate 301 located between the locking member 4 and the support body 20. The locking member 4 is rotatably connected to the fixing cover plate 301, and the locking member 4 can switch between the first locking position and the first unlocking position by rotating. The locking member 4 can be driven to rotate by the driving member 2. Specifically, the locking member 4 includes a locking member body 42, a third elastic member 44, and a locking rod 43 configured to be locked with the height adjustment gear 201. The third elastic member 44 is located between the fixing cover plate 301 and the locking member body 42, and is capable of providing an elastic force that keeps the locking rod 43 in the first locking position. A central portion of the locking member body 42 is provided with a pivot portion 421, which can be pivotally connecting to the fixing cover plate 301. An upper portion of the locking member body 42 is provided with a matching portion 422 that can match the driving member 2. The locking rod 43 is located at a lower portion of the locking member body 42. The driving member 2 is provided with a pushing portion 22 corresponding to the matching portion 422. The operating member 1 and the driving member 2 can both slide along an up-and-down direction of the headrest 30. The matching portion 422 is pushed by the pushing portion to rotate under a movement of the driving member 2, such that the locking member 4 can be driven by the driving member 2 to switch between the first locking position and the first unlocking position. In the illustrated embodiment, the pushing portion 22 is an inclined ramp. The movement of the locking member is achieved by cooperation between the inclined ramp and the matching portion 422. In this embodiment, the driving member 2 is U-shaped plate, and the pulling member 21 is located in a middle portion of the driving member 2. There are two pushing portions 22, and the two pushing portions 22 are located at both ends of the driving member 2, respectively. Correspondingly, there are two locking members 4, and the two locking members 4 are symmetrically arranged.

Referring to FIG. 1 to FIG. 5, the support body 20 includes a backrest 202. The headrest 30 is movably provided on the backrest 202, and the height adjustment gear 201 is provided on the backrest 202. The height of the headrest 30 can be adjusted relative to the backrest 202 by matching the height adjustment mechanism 10 with the height adjusting gear 201. The height adjusting gear 201 includes a plurality of locking grooves provided on the backrest 202, the locking grooves are arranged at intervals along an up-and-down direction of the child support device 100. The locking member 4 can be selectively engaged in any of the locking grooves to achieve locking. In this embodiment, the backrest 202 is a fixing device. Of course, in other embodiments, the backrest 202 can move along the up-and-down direction of the child support device 100.

Referring to FIG. 1 to FIG. 7, an operating principle of the aforementioned child support device 100 will be described in greater details below.

When the height of the headrest 30 needs to be adjusted relative to the support body 20, the operating member 1 in the initial position can be pulled upward. The operating member 1 overcomes the elastic force of the second elastic member 5 and slides upward from the initial position to the first operating position (shown in FIG. 4 to FIG. 5). The pulling member 21 slides from an upper end of the avoiding hole 12 to a lower end of the avoiding hole 12, while the driving member 2 remains still. At the same time, an upward movement of the operating member 1 causes the driving hole 11 to move upward, and the sliding block 31 is driven to move by the first guide hole 111 of the driving hole 11, such that the safety lock structure 3 switches from the second locking position to the second unlocking position, i.e., the locking pin 32 and the locking hole 41 are switched from the engaged state to the unengaged state. At this moment, the safety lock structure 3 unlocks the locking member 4, and the locking member 4 can pivot freely between the first locking position and the first unlocking position.

Figure 6:
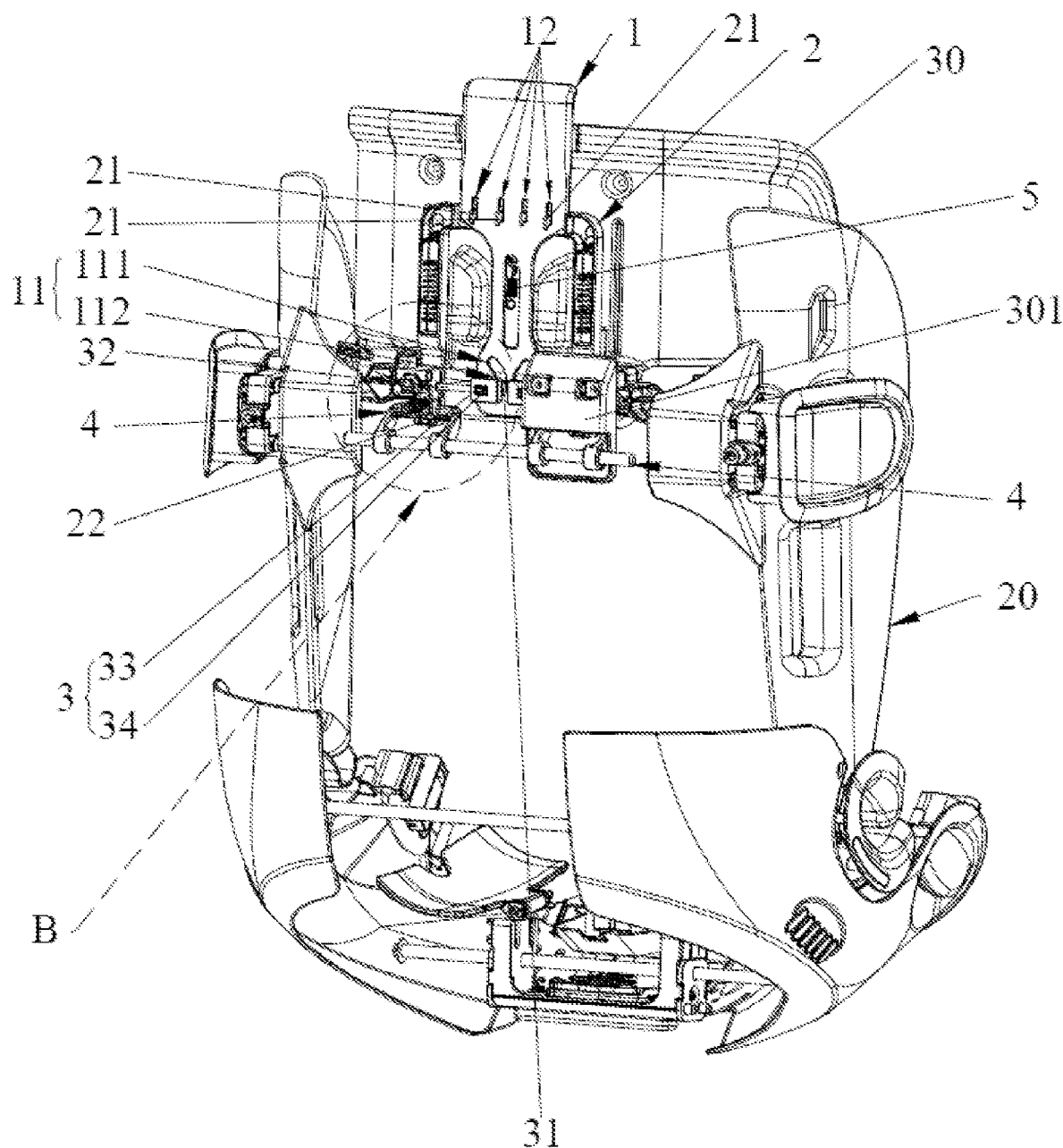
FIG. 6 is a perspective view of the child support device illustrating a state where an operating member is in the second operating position.
Figure 7:
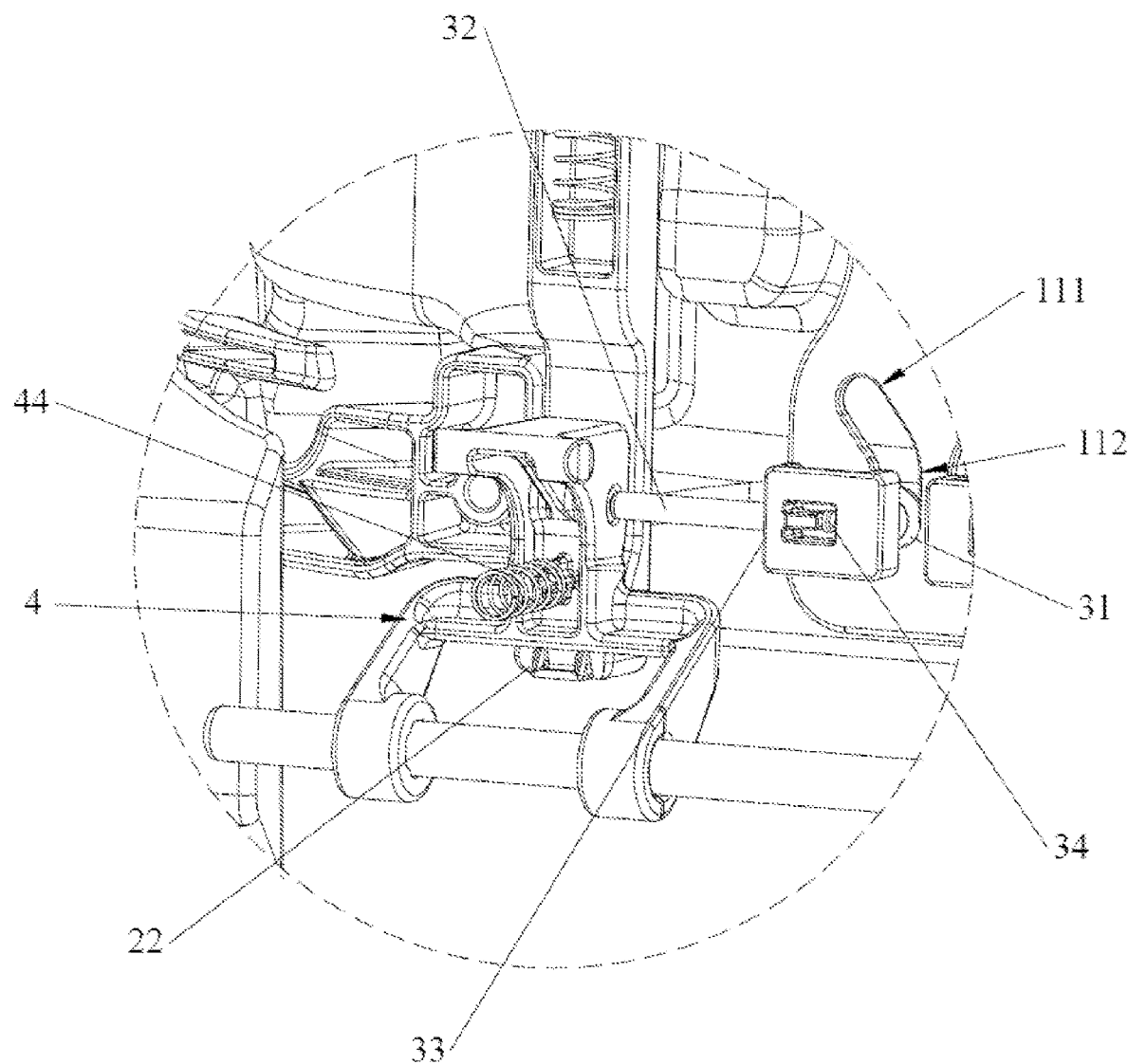
FIG. 7 is a partial enlarged view of portion B of FIG. 6.

The operating member 1 in the first operating position is continued to be pulled upward, the operating member 1 will overcome the elastic force of the second elastic member 5 and slides from the first operating position to the second operating position (shown in FIG. 6 to FIG. 7). The sliding block 31 is driven to move by the second guide hole 112 of the driving hole 11, such that the safety lock structure 3 is hold in the second unlocking position. At the same time, the driving hole 11 continues to rise, and the pull member 21 moves upward under the limiting of the driving hole 11. During the upward movement of the driving member 2, the matching portion 422 of the locking member 4 is pushed to rotate by the pushing portion 22 of the driving member 2 to overcome the elastic force of the third elastic member 44, such that the locking member 4 switches from the first locking position to the first unlocking position. The locking rod 43 of the locking member 4 is disengaged from the height adjustment gear 201, then the height of the headrest 30 can be adjusted freely relative to the support body 20. When the headrest 30 moves to a desired position, the operating member 1 is released, and the operating member 1 is reset by the elastic force of the second elastic member 5. The locking member 4 switches from the first unlocking position to the first locking position, and the locking rod 43 of the locking member 4 is engaged with the height adjustment gear 201, such that the headrest 30 is locked in the desired position.

Since the height adjustment mechanism 10 includes the safety lock structure 3 and the operating member 1 having the initial position, the first operating position, and the second operating position, the safety lock structure 3 is configured to lock the locking member 4 in the locking position. The safety lock structure 3 is movably connected on the operating member 1, and the safety lock structure 3 is driven by the operating member 1 switching from the initial position to the first operating position to unlock the locking member 4, such that a subsequent unlocking operation can be performed only when the operating member 1 moves to the first operating position. At the same time, one side of the driving member 2 is slidably connect to the operating member 1, the other side of the driving member 2 abuts against the locking member 4. The driving member 2 is pulled by the operating member 1 switching from the first operating position to the second operating position, such that the locking member 4 is driven by the driving member 2 to switch from the first locking position to the first unlocking position, so as to achieve a purpose of unlocking. In other words, if it is required to adjust the height of the headrest 30, the safety lock structure 3 should be firstly unlocked by the operating member 1, and then a subsequent height adjustment of the headrest 30 can be achieved by disengaging the locking member 4 from the height adjustment gear 201, so as to avoid an accidental unlocking of the headrest 30. A two-step unlocking method can avoid the abnormal unlocking phenomenon of the conventional height adjustment mechanism effectively, thereby improving the safety of the child support device 100. The height adjustment mechanism 10 also has an advantage of convenient usage.

Although the respective embodiments have been described one by one, it shall be appreciated that the respective embodiments will not be isolated. Those skilled in the art can apparently appreciate upon reading the disclosure of this application that the respective technical features involved in the respective embodiments can be combined arbitrarily between the respective embodiments as long as they have no collision with each other. Of course, the respective technical features mentioned in the same embodiment can also be combined arbitrarily as long as they have no collision with each other.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A height adjustment mechanism for a headrest, comprising:
    a locking member having a first locking position and a first unlocking position, and the locking member being capable of switching between the first locking position and the first unlocking position;
    an operating member slidably provided on the headrest and having an initial position, and a first operating position with respect to the headrest;
    a safety lock structure configured to lock the locking member in the first locking position, the safety lock structure being movably connected on the operating member, wherein the safety lock structure is driven by the operating member switching from the initial position to the first operating position to unlock the locking member; and
    a driving member connected between the operating member and the driving member, wherein the driving member is driven by the operating member to drive the locking member to switch from the first locking position to the first unlocking position.

2. The height adjustment mechanism of claim 1, wherein the operating member further has a second operating position with respect to the headrest, the operating member is capable of switching among the initial position, the first operating position and the second operating position, and the driving member is pulled by the operating member switching from the first operating position to the second operating position, so as to drive the locking member to switch from the first locking position to the first unlocking position.

3. The height adjustment mechanism of claim 1, wherein the safety lock structure has a second locking position configured to lock the locking member at the first locking position, and a second unlocking position configured to unlock the locking member, and switching of the operating member from the initial position to the first operating position causes the safety lock structure to switch from the second locking position to the second unlocking position.

4. The height adjustment mechanism of claim 3, wherein the operating member is provided with a driving hole, the safety lock structure comprises a sliding block slidably located in the driving hole, and the sliding block is driven by the driving hole to move, such that the safety lock structure switches from the second locking position to the second unlocking position.

5. The height adjustment mechanism of claim 4, wherein the driving hole comprises a first guide hole and a second guide hole that are in fluid communication with each other, the first guide hole is configured to switch the safety lock structure from the second locking position to the second unlocking position, the second guide hole is configured to hold the safety lock structure in the second unlocking position.

6. The height adjustment mechanism of claim 5, wherein an extending direction of the first guiding hole intersects with a movement direction of the operating member, and an extending direction of the second guiding hole is parallel with the movement direction of the operating member.

7. The height adjustment mechanism of claim 4, wherein the safety lock structure comprises a locking pin, the locking member is provided with a locking hole corresponding to the locking pin, when the safety lock structure is in the second locking position, the locking pin is inserted into the locking hole; and when the safety lock structure is in the second unlocking position, the locking pin is disengaged from the locking hole.

8. The height adjustment mechanism of claim 7, wherein the safety lock structure further comprises a safety lock body and a first elastic member received in the safety lock body, the sliding block is located on a side of the safety lock body adjacent to the operating member, and the locking pin is elastically connected to the safety lock body via the first elastic member.

9. The height adjustment mechanism of claim 2, wherein the operating member is provided with an avoiding hole, the driving member comprises a pulling member inserted in the avoiding hole, when the operating member switches between the initial position and the first operating position, the pulling member slides in the avoiding hole, and the switching of the operating member from the first operating position to the second operating position causes the pulling member to move under a limiting of the driving hole, and the locking member is driven to switch from the first locking position to the first unlocking position.

10. The height adjustment mechanism of claim 9, wherein the pulling member is an inserting piece, and the avoiding hole is an elongated hole matching the inserting piece.

11. The height adjustment mechanism of claim 1, further comprising a second elastic member capable of providing an elastic force that keeps the operating member in the initial position.

12. The height adjustment mechanism of claim 1, wherein the locking member switches between the first locking position and the first unlocking position by rotating, and the locking member is pushed by the driving member to rotate.

13. The height adjustment mechanism of claim 12, wherein the locking member comprises a locking member body and a locking rod configured to be locked in a height adjustment gear, a central portion of the locking member body is provided with a pivot portion, an upper portion of the locking member body is provided with a matching portion matching the driving member, and the locking rod is located at a lower portion of the locking member body.

14. The height adjustment mechanism of claim 13, wherein the driving member is provided with a pushing portion corresponding to the matching portion, and the matching portion is pushed by the pushing portion to rotate under a movement of the driving member.

15. The height adjustment mechanism of claim 14, wherein the pushing portion is an inclined ramp.

16. The height adjustment mechanism of claim 13, wherein the locking member further comprises a third elastic member capable of providing an elastic force that keeps the locking rod in the first locking position.

17. A child support device, comprising:

a support body;

a headrest movably provided on the support body; and the height adjustment mechanism of claim 1 provided on the headrest, wherein the support body comprises a height adjustment gear for adjusting a height of the headrest, the locking member is pivotally connected to the headrest, and the operating member and the driving member are slidably provided on the headrest.

18. The child support device of claim 17, wherein the operating member and the driving member both slide along up and down directions of the headrest.

19. The child support device of claim 17, wherein the child support device comprises a backrest, the headrest is movably provided on the backrest, the height adjustment gear is provided on the backrest, and the height of the headrest is adjusted relative to the backrest by matching the height adjustment mechanism with the height adjusting gear.

20. The child support device of claim 19, wherein the height adjusting gear comprises a plurality of locking grooves provided on the backrest, the locking grooves are arranged at intervals along up and down directions of the child support device, and the locking member in the first locking position is locked in any of the locking grooves selectively.

21. The child support device of claim 17, wherein the headrest comprises a fixing cover plate located between the locking member and the child support device, and the locking member is rotatably connected to the fixing cover plate.

* * * * *